United States Patent [19]
Conger et al.

[11] Patent Number: 5,261,721
[45] Date of Patent: Nov. 16, 1993

[54] VEHICULAR WINDOW ASSEMBLY WITH WEATHER SEAL

[75] Inventors: Lawrence D. Conger; Gregory R. Cook, both of Holland; Bruce C. Bertelson, Grand Rapids; Scott A. Addicott, Nunica; James L. Brodie, Hudsonville, all of Mich.

[73] Assignee: Donnelly Corporation, Holland, Mich.

[21] Appl. No.: 957,417

[22] Filed: Oct. 5, 1992

Related U.S. Application Data

[63] Continuation of Ser. No. 779,109, Oct. 18, 1991, abandoned.

[51] Int. Cl.$^5$ .................................................. B60J 1/00
[52] U.S. Cl. .............................. 296/146.15; 296/201; 52/208; 49/475.1
[58] Field of Search ............. 296/201, 93, 202, 146 M; 52/208; 49/475, 490, 491

[56] References Cited

U.S. PATENT DOCUMENTS

| | | | |
|---|---|---|---|
| 4,072,340 | 2/1978 | Morgan | 296/84 |
| 4,119,325 | 10/1978 | Oakley | 277/207 |
| 4,139,234 | 2/1979 | Morgan | 296/84 |
| 4,396,221 | 8/1983 | Morgan et al. | 296/84 |
| 4,505,511 | 3/1985 | Hanle et al. | 296/93 |
| 4,625,459 | 12/1986 | Warner | 49/488 |
| 4,738,482 | 4/1988 | Bohm et al. | 296/216 |
| 4,765,677 | 8/1988 | Nagata | 296/216 |
| 4,858,988 | 8/1989 | Morgan et al. | 296/201 |
| 4,891,913 | 1/1990 | Shimura et al. | 49/493 |
| 4,925,237 | 5/1990 | Bohn et al. | 296/216 |
| 5,050,928 | 9/1991 | Bohm et al. | 296/216 |
| 5,083,835 | 1/1992 | Rossini | 296/201 |

FOREIGN PATENT DOCUMENTS 2901327 7/1982 United Kingdom .

OTHER PUBLICATIONS

Essex Chemical Corporation, Material Safety Data Sheet, Apr. 6, 1990.
General Motors Corp., Material Safety Data Sheet, Re. Dorrie Process Co., Inc. Adhesive 90-24, Feb. 8, 1984.

Primary Examiner—Robert R. Song
Attorney, Agent, or Firm—Price, Heneveld, Cooper, DeWitt & Litton

[57] ABSTRACT

An opaque or transparent panel assembly for a vehicle having a weather and noise seal for an opening in the vehicle. The assembly includes a first panel having a peripheral edge wherein at least portions of the peripheral edge are encased or captured by a molded PVC or reaction injection molded (RIM) urethane gasket. A portion of the gasket is located so as to lie adjacent the opening to receive the seal. A seal carrier is provided and captured within the portion of the gasket adjacent the opening so that a first portion of the carrier is secured within the gasket. A second portion of the carrier includes a flange which extends into the opening by a predetermined distance. A seal is disposed along the flange which is adapted to engage the panel closing the vehicle opening to form the secondary seal. The seal may be a bulb or bubble seal mounted on the flange. Alternatively, the panel closing the vehicle opening may be a door or window. The first panel may be a windscreen, rear light or side window. The first panel may also be fixed or coupled to a window regulator mechanism to raise and lower the first panel.

29 Claims, 4 Drawing Sheets

VEHICULAR WINDOW ASSEMBLY WITH WEATHER SEAL

This is a continuation of copending application Ser. No. 07/779,109, filed Oct. 18, 1991, now abandoned.

BACKGROUND OF THE INVENTION

This invention relates to a panel assembly, and more particularly to a panel assembly for vehicles, either of the fixed or movable variety, having a support or carrier for a weather seal to provide an improved seal against the elements, road and wind noise.

In the past, doors and windows on vehicles were provided with a single seal to barricade the vehicle interior from the elements and outside noise. For automobiles, such seals are provided around the doors and window openings, and the trunk or baggage compartment. With time and exposure to the elements, such seals become brittle, eroded and ineffective. The remedy is to replace the seal, often requiring the skill of a technician to complete the repair. In addition, otherwise perfectly good seals would occasionally leak because of debris or misalignment of the seal, admitting rain, dust, road and traffic noise into the vehicle interior, creating a nuisance to the vehicle occupant or owner.

As a consequence, it was desired to provide an improved weather seal in or on various joint areas of a vehicle which may be easily replaced. Such a seal may provide the primary seal for the vehicle opening to barricade unwanted dust, water, road noise and the like, from the interior compartment. The seal may also provide a secondary seal to the primary seal. However, the mounting of replaceable seals was difficult in certain vehicle areas, such as around windows, and particularly, where doors closed against window edges. The present invention was conceived as a solution for these and other problems.

SUMMARY OF THE INVENTION

Accordingly, the instant invention provides a panel assembly for vehicles having a weather seal thereon to prevent the incursion of wind, rain, snow, dust or outside road and traffic noise into the vehicle interior compartment.

In one aspect, the invention is a panel assembly for vehicles including a first panel-like sheet of predetermined size and shape, and a gasket made from a polymeric material molded around and encapsulating a portion of the peripheral edge of the sheet thereon. A portion of the gasket is adapted to be adjacent and extend along an opening in the vehicle adapted to receive another panel such as a door or window. The portion of the gasket adjacent the opening has a flange extending therefrom wherein a first edge of the flange is retained in the gasket. The opposite edge of the flange extends into the vehicle opening and receives a seal thereon. The seal engages the panel or window closing the opening providing a barrier against the elements.

In another aspect of the invention, the panel assembly is adapted to be installed as a complete unit in a first opening of the vehicle from the exterior. The panel assembly includes a sheet having a predetermined size and shape to fit in the opening of the vehicle and produce a tight seal and a pleasing aesthetic appearance. Molded around the sheet and encapsulating at least a portion of the peripheral edge is a gasket made from a polymeric material such as polyvinyl chloride (PVC) or reaction injection molded (RIM) urethane. A bezel covers a portion of the exterior surface of the gasket having one end molded into the exterior surface of the gasket. A second end of the bezel is molded within the portion of the gasket adjacent a second opening and has a flange which extends into the adjacent opening. The ends of the bezel molded within the gasket assure coupling of the bezel to the gasket, as well as providing a secure attachment of the bezel flange to the panel assembly. The flange extending from the bezel is fitted with a seal to provide a weather and noise seal for the panel or window closing the opening.

Another aspect of the invention provides a movable, lift window adapted to be installed in a window opening of the vehicle and move between an open and a closed position. This movable window includes a glass sheet having a peripheral edge, a gasket made from a polymeric material molded around and encapsulating at least a portion of the peripheral edge of the glass sheet. A portion of the gasket is adapted to lie adjacent a second opening in the vehicle to be closed by a panel such as a door or window. The gasket includes a metallic or plastic flange having a first portion secured to the peripheral edge of the glass sheet by a suitable bond or mechanical coupling. The gasket is molded about the peripheral edge of the glass sheet and is secured thereto by securing flanges which encapsulate a substantial portion of the flange fixed to the glass sheet. A second portion of the flange extends from the gasket into the second opening of the vehicle and is fitted with a seal, such as a bulb or bubble seal, which runs the length of the flange. The bulb or bubble seal is compressed between the panel or window closing the second opening and the second portion of the flange to form a substantially tight weather and noise seal therebetween.

The invention thus provides numerous advantages over prior modular-type panel assemblies. The assembly provides a panel unit which is complete and ready for installation in the vehicle as a unit. Further, the assembly appropriately seals out water and dirt while providing a substantially flush, aesthetically pleasing positioning of the panel or window with the outer surface of the vehicle. The molded-in seal carrier provides the structure auto makers need for a secondary or redundant weather and noise seal to protect the vehicle's interior compartment. Moreover, the inventive panel assembly has many applications where one panel is adjacent another that may be opened or closed.

These and other objects, advantages, purposes and features of the invention will become more apparent from a study of the following detailed description taken in conjunction with the attached drawing figures.

DETAILED DESCRIPTION OF THE PREFERRED EMBODIMENTS

Figure 1:
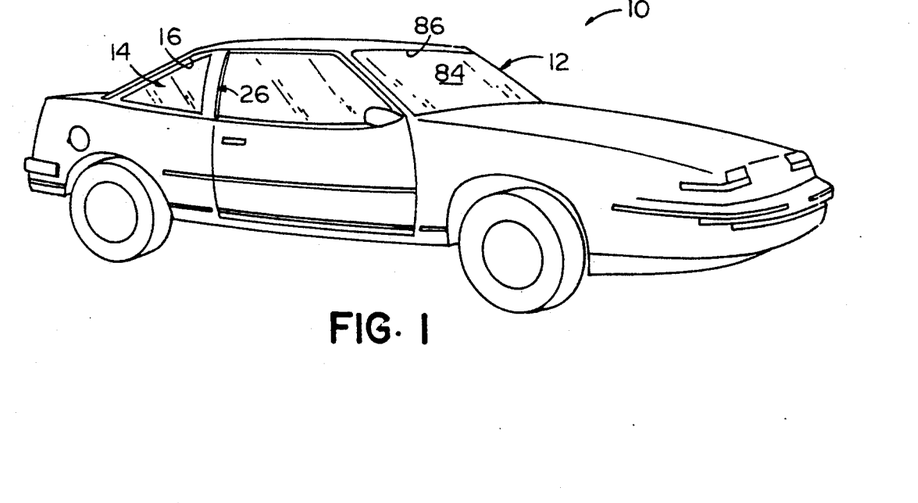
FIG. 1 is a general perspective view of an automobile illustrating the basic environment of the invention.
Figure 2:
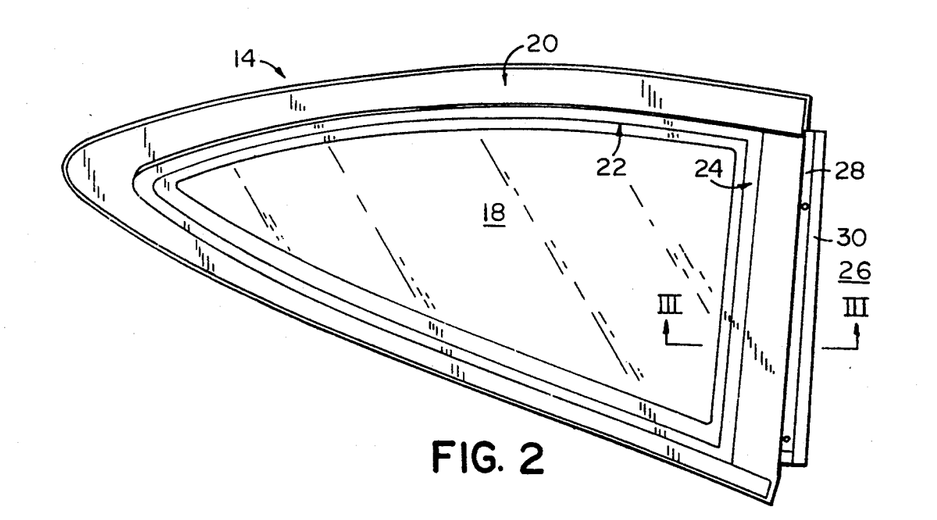
FIG. 2 is a side elevation view of a modular rear-quarter window incorporating the present invention and adapted to be mounted in a fixed position.

Panel or panel assembly as used herein shall generally refer to either an opaque or transparent panel such as metal, ceramic, polymeric or glass sheet adapted to conform to the body style of a vehicle. Such panels include doors, fixed or lift windows, cowl panels, leaf screens, door frames and the like. Referring now to the drawing figures, FIG. 1 is a general illustration of a vehicle 10 wherein panel assemblies of the present invention may be used. The panel assemblies are preferably of the modular type which are complete and ready for installation as a unit, generally from the exterior of the vehicle. A modular panel includes a transparent or opaque sheet of material containing a gasket adapted to be mounted in an opening of the vehicle. The gasket and inner surface of the sheet may be fixed to the vehicle by an adhesive. Examples of modular panel or window assemblies include the front windscreen 12, rear-quarter windows 14 and rear window (not shown). Although the following discussion will be directed toward specific embodiments of the panel assemblies of the invention in a vehicle, such assemblies are exemplary of the invention and it is to be understood that this invention has application outside windows or similar panels for vehicles.

Referring now to the drawing figures in greater detail, FIGS. 2-5 illustrate a rear-quarter window or panel assembly 14 adapted to be installed as a complete unit. The panel assembly is adapted to be mounted in an opening 16 of the vehicle from the exterior and to fit substantially flush with the exterior surface of the vehicle body. Rear-quarter panel assembly 14 has a peripheral outline or configuration designed to match the exterior contour of the vehicle, and includes a sheet-like panel 18 of transparent or opaque material such as a sheet of automobile safety glass. Opaque sheets can be used when the assembly is designated for decorative purposes as opposed to providing visibility. Glass panel 18 may have a cosmetic ceramic frit coating applied to a peripheral boarder area of an interior surface before the glass panel is installed into the assembly.

Panel or glass sheet 18 is retained in panel assembly 14 by a tough, flexible, resilient gasket or casing 20 which extends continuously around the entire peripheral edge 22 of the panel and is preferably formed by molding polyvinyl chloride (PVC) or reaction injection molded (RIM urethane therearound. In certain situations, such as described below, gasket 20 may be molded around select portions of the panel periphery. In either case, a suitable primer may be applied to peripheral edge 22 of panel 18 before molding to insure a secure bond between the panel and the gasket. For PVC gaskets, one such primer is a water born urethane produced under the designation DX-4A by Donnelly Corporation of Holland, Mich. For RIM urethane gaskets, the primer designated SPECTRUM 5 by The Dow Chemical Company of Midland, Mich. may be used. The primer prepares the surfaces of the glass sheet to form a better bond with the molded gasket. Although polyvinyl chloride or RIM urethane is disclosed, other polymeric and/or moldable materials may be used to form the gasket. Similarly, other transparent sheetings such as acrylic or other plastic material may be used instead of glass, depending on the desired panel application. Of course, glass coated with an opaque or translucent ceramic frit layer, or other material on its entire interior or exterior surface, may be substituted for transparent glass or plastic sheeting to produce decorative or other panel assemblies within the scope of this invention.

A portion 24 of gasket 20 is adapted to lie adjacent a second opening 26 in vehicle 10 to be closed by a door, window or other movable panel. It is preferred, in a first embodiment, that portion 24 of gasket 20 adjacent second opening 26 retain a seal carrier 28. Seal carrier 28 runs substantially along the entire length of gasket portion 24 adjacent the opening and extends a sufficient distance outwardly from the gasket toward the second opening 26 so as to properly position a weather seal or strip 30 to engage the closing panel or window. However, seal carrier 28 does not extend so far into the second opening as to interfere with the primary seal for the opening (not shown).

Figures 3, 5:
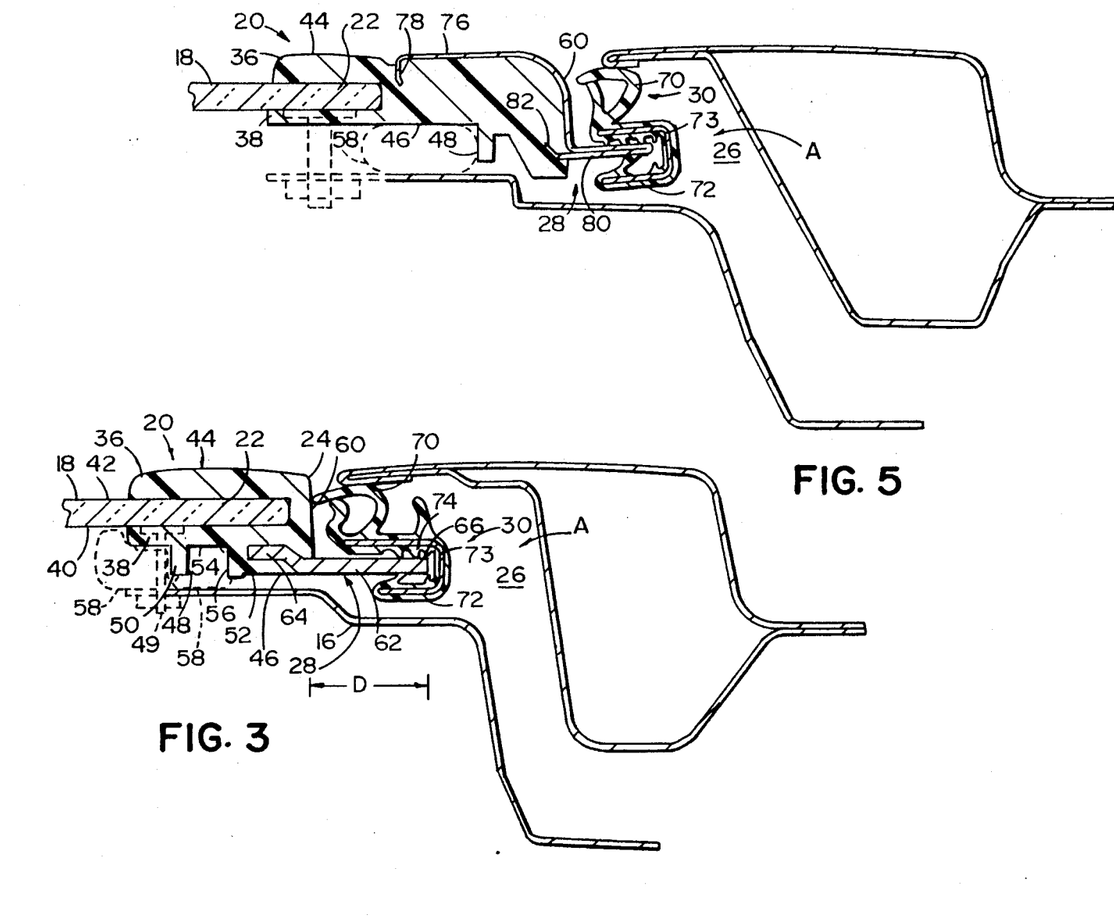
FIG. 3 is a section view of the modular rear-quarter window taken along line III—III in FIG. 2.
FIG. 5 is a section view of another modular rear-quarter window similar to that in FIG. 2 but illustrating an alternate embodiment of the seal carrier.

FIG. 3 is a section view of rear-quarter panel assembly 14 proximate the second opening 26 in the vehicle. The portion of the panel assembly taken in cross section is adjacent and extending along the B-pillar 36 defining a portion of the opening and receiving the door of the vehicle. The glass or other sheet-like panel 18 has its previously primed peripheral edge 22 encapsulated by molded gasket 20. The gasket is molded about panel 18 such that at least a portion of the previously primed peripheral edge 22 is sandwiched between inner and outer securing flanges 36 and 38, respectively. The molded securing flanges 36, 38 extend inwardly along the inner and outer surfaces 40, 42 of panel 18 from peripheral edge 22.

The outer surface 44 of gasket 26 is aerodynamically shaped and produces a pleasing aesthetic appearance while inner surface 46 of gasket 20 may contain a spacer 48, defined by flange 50 or possess some other cross-sectional profile adapted to engage the vehicle. In the embodiment shown, spacer 48 may extend around the entire inner surface 46 of the gasket to locate the panel at a predetermined point within the vehicle. A bead of adhesive 58 adheres the gasket to the sheet metal flange defining opening 16 in the vehicle. In addition, the gasket may contain studs such as that shown in phantom at 49 in FIG. 3 fixed thereon or on sheet 18 adapted to be received by the vehicle. The adhesive used to bond the gasket and panel to the sheet metal opening may be butyl or similar adhesive and is generally available.

Extending from the outer edge 60 of gasket 20 along portion 24 adjacent and extending along the B-pillar opening 26 of the vehicle, is seal carrier 28 defined by a flange 62 having a first edge 64 captured, embedded and retained within the gasket. The second and opposite edge 66 of the seal carrier extends a predetermined distance "D" out of the gasket and into the B-pillar opening 26 closed by the door or window. Seal carrier 28 may b=made from a strong, rigid material such as metal or plastic and has a length coextensive with portion 24 of gasket 20 adjacent opening 26. A suitable metal for carrier 28 is stamped, roll-formed or extruded aluminum or steel, and a suitable plastic is a glass-filled Nylon.

Figure 4:
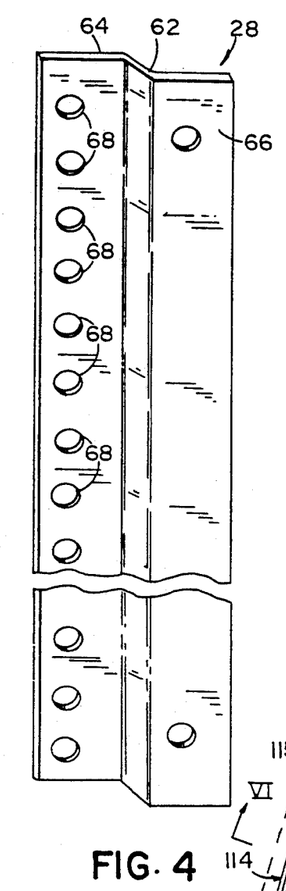
FIG. 4 is a perspective view of the seal carrier prior to incorporation in the molded panel assembly.

As seen in the perspective view of seal carrier 28 provided in FIG. 4, a plurality of perforations 68 may extend through carrier 28 proximate the first edge 64 captured in the molded gasket. The perforations allow the molded gasket material to pass therethrough during molding and securely fasten flange 62 within the molded gasket. As is well-known in the art, flange 62 may be retained in place within a suitable mold apparatus during the molding process by suitable clamps or pins. Although it is preferred that first edge 64 of the carrier contain a plurality of perforations, other structures may be used to interlock with the molded gasket material. Such structures include nipples or T-shaped projections.

The second edge 66 of the seal carrier flange 62 extending into B-pillar opening 26 is adapted to receive a conventional weather seal, such as a bubble seal 30. The bubble seal is made of a soft rubber or polymer material forming a substantially closed volume or "bubble" 70 to contact, be compressed by and seal with the door or window of the vehicle closing the opening 26. Seal 30 may also include bendable, metal reinforcement 73 molded therewithin and is retained on flange 62 by a molded jaw or channel 72 having a set of resilient, rubber or polymeric, molded serrations or teeth 74. Serrations or teeth 74 allow the seal to be placed on the flange in a first direction, shown by arrow A, but inhibit removal of the seal in an opposite direction. In this manner, bubble seal 30 is securely retained on flange 66 of seal carrier 28 yet may be easily replaced without requiring a great deal of skill. A suitable bubble seal 30 may be obtained for the desired application from Standard Products Company of Dearborn, Mich.

FIG. 5 illustrates an alternate embodiment of seal carrier 28 including a panel or glass sheet 18 having its peripheral edge 22 encapsulated by securing flanges 36, 38 of portion 24 of molded gasket 20. Outer surface 44 of gasket 20 has a shape of contour which conforms to the exterior shape of the vehicle. The interior surface of the gasket has a channel 48, as in the previous embodiment, for receiving a bead of adhesive 58 to secure the gasket to the vehicle body. As above, additional fastening studs 49 on the window sheet or in gasket 20 may also be used. Exterior surface 44 of gasket 20 is partially enclosed by a bezel 76 having a first, hook-shaped end 78 embedded in the gasket proximate panel or glass sheet 18. Bezel 76 wraps around the gasket in close conformity to the exterior surface 44 and is folded upon itself at outer edge 60 of the gasket to form a flange 80 which extends from gasket 20 at outer edge 60 thereof. The second J-shaped end 82 of the bezel proximate folded flange 80 is also molded within the gasket. The bezel is thus retained in the gasket at two spaced positions. Flange 80 extends substantially the entire length of portion 24 of gasket 20 adjacent B-pillar opening 26. Flange 80 extends a predetermined distance "D" into B-pillar opening 26 of the vehicle and receives weather seal 30, in the manner described above.

Figure 6:
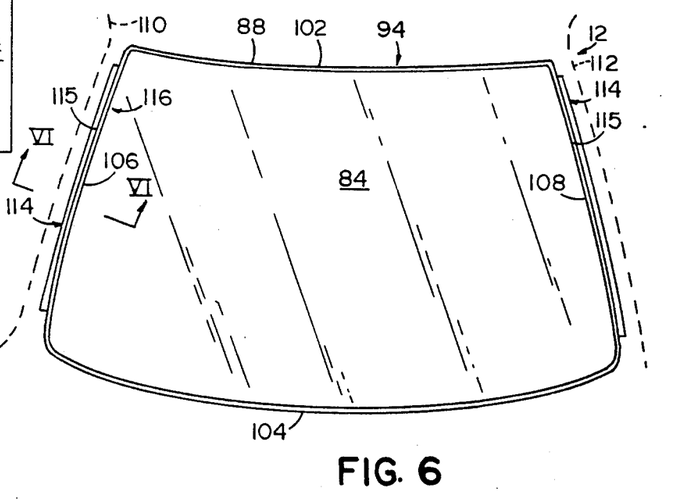
FIG. 6 is a top plan view of the modular windscreen shown in FIG. 1.
Figure 7:
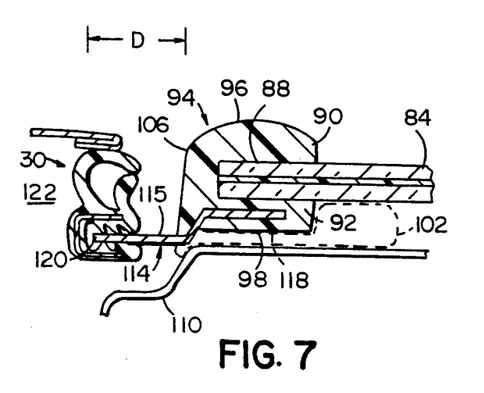
FIG. 7 is a section view of the gasket and seal carrier of the modular windscreen taken along line VII—VII in FIG. 6.

FIG. 6 is a plan view of the windscreen assembly 12 shown in FIG. 1 illustrating another application of the seal carrier of the present invention. Windscreen 12 includes a transparent sheet 84 of laminated safety glass having a shape and contour adapted to fit within windscreen opening 86 of vehicle 10. The shape and contour are such that sheet 84 conforms to the exterior shape of the vehicle and fits substantially flush in opening 86. As shown in FIG. 7, a peripheral edge 88 of sheet 84 previously primed with an adherence promoting coating, as described above, is encapsulated by securing flanges 90, 92 of a molded RIM urethane gasket 94 in the same manner as described above in reference to FIGS. 2-5. The outer surface 96 of gasket 94 has a low contour to improve aerodynamics and provide a pleasing aesthetic appearance. The inner surface 98 of gasket 94 may be matched to the contour of the adjacent vehicle body or contain a channel, as described above, adapted to receive a bead of adhesive 102 in order to seal windscreen 12 in the opening. It is contemplated that since the upper and lower edges 102, 104 of windscreen 12 will be secured against fixed panels, only the outer edges 106, 108 of the windscreen adjacent A-pillars 110, 112 receive seal carrier 114. However, depending upon the particular application, the entire peripheral edge of the panel may contain the seal carrier.

As shown in FIG. 7, seal carrier 114 is comprised of a flange 115 having a length coextensive with the portion 116 of molded gasket 94 adjacent the A-pillars. A first edge 118 of carrier 114, which again may include apertures or perforations for secure attachment within the gasket, is molded within and encapsulated by gasket 94. A second and opposite edge 120 of flange 115 extends a predetermined distance "D" into opening 122 adjacent A-pillar 110, 112. As in the previous embodiments, the second end 120 of the flange 115 extending into the opening 122 receives bubble seal 30 adapted to contact and seal with the door or window panel, closing opening 122.

In each of the embodiments of the seal carrier 28 and 114 described above, the flange which supports and mounts the bubble or other weather strip or seal may contain certain angles or bends to locate seal 30 in a desired location within the vehicle opening. As shown in FIGS. 3 and 7, the seal carrier has two folds in the middle of the flange to enable the edge of the flange embedded within the molded gasket to have sufficient molded material on either side for secure retention and support. The folds also position the outer end of the flange for receiving the seal at an appropriate location within the opening.

Figure 8:
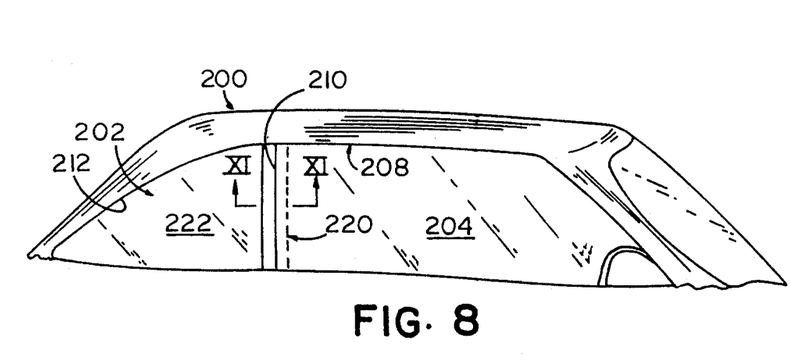
FIG. 8 is a fragmentary, side elevation view of an automobile generally illustrating a sealing relationship of a rear-quarter lift window with a door lift window.
Figure 9:
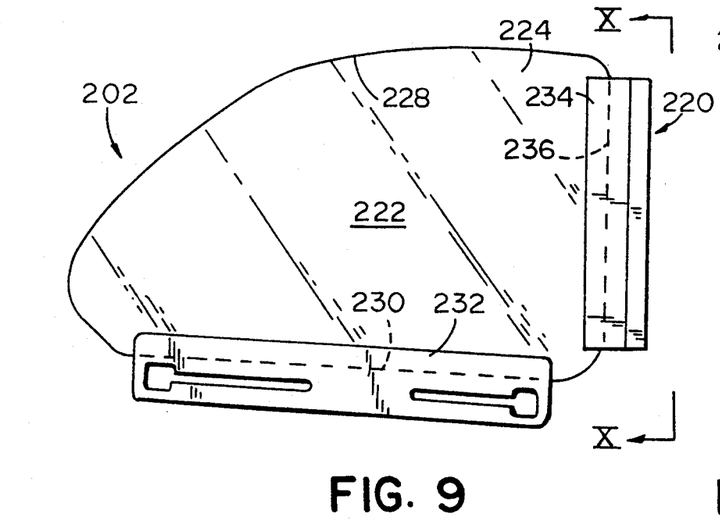
FIG. 9 is a side elevation view of a rear quarter lift window assembly.
Figure 10:
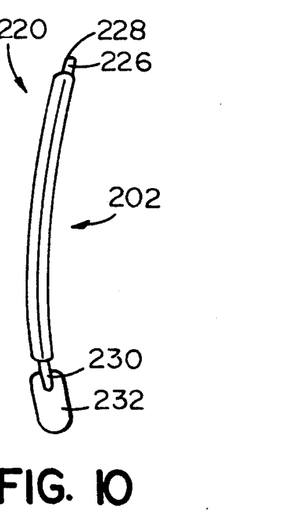
FIG. 10 is an end elevation view of the rear-quarter lift window assembly along line X—X in FIG. 9.

FIG. 8 is a side elevation view of the automobile 200 generally illustrating the relationship of the rear-quarter lift window 202 with the door lift window 204, while FIGS. 9 and 10 are side and end elevation views, respectively, of the preferred rear-quarter window panel assembly 202. Referring to these drawing figures in greater detail, the rear-quarter panel assembly and door panel 202, 204 are located along the side of the vehicle and are adapted to be moved between a lowered or open position and a raised or closed position. It is preferred that each panel 202, 204 be constructed from a transparent material so that the operator of the vehicle may be able to see outside in substantially all directions.

The panel or window assemblies 202, 204 are disposed within the vehicle such that they may be raised or lowered by regulator mechanisms attached to the lower edge of each panel. U.S. patent application Ser. No. 07/762,892, filed Sept. 19, 1991, entitled PANEL ASSEMBLY FOR VEHICLES WITH MOLDED REG- ULATOR ATTACHMENT and assigned to the assignee of this invention, discloses a regulator mechanism and an apparatus for coupling the regulator mechanism to the panels which may be used with the present invention, and is incorporated herein by reference. In the raised or up position, each panel is adapted to be held within the opening provided for the panel, and have a shape and form so as to lie substantially flush with the vehicle exterior. With each panel 202. 204 in the up position, a substantially weathertight seal is formed with the vehicle by having an upper peripheral edge 208 of each panel received by a channel (not shown) defined along the upper edge of the opening Similarly, a substantially weathertight seal is formed along a joint 210 between rear-quarter panel 202 and door panel 204, formed by a seal 220.

As illustrated in the FIGS. 9 and 10, rear-quarter window assembly 202 includes a sheet-like panel 222, preferably of laminated or tempered safety glass, having a shape and size adapted to fit within opening 212 of the vehicle. The panel is typically contoured so as to complement the overall shape of the vehicle. Panel 222 includes a peripheral edge 224 defining a substantially vertical, leading edge portion 226, an upper arcuate portion 228 and a substantially horizontal lower portion 230. Lower peripheral edge 230 of panel 222 may nave molded thereon an attachment member 232 adapted to interconnect the panel to the window regulator mechanism, as defined in U.S. patent application Ser. No. 07/762,892 mentioned above. The leading peripheral edge 226 of panel 222 is encapsulated along a substantial portion of its length by a polymeric material such as polyvinyl chloride (PVC) or reaction injection molded (RIM) urethane to form a gasket or trim assembly 234. Gasket or trim piece 234 carries weather seal 220 adapted to engage the inside surface of window panel 204 on the door panel proximate its trailing edge 238 (FIG. 11).

Figure 11:
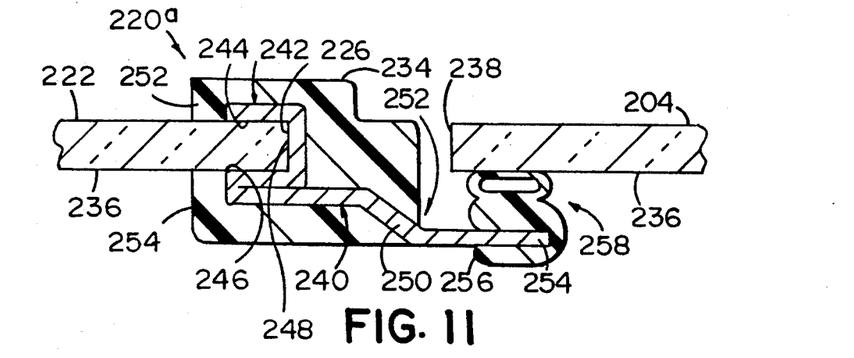
FIGS. 11 and 12 are section views of various alternative sealing arrangements between the rear-quarter lift window and the door lift window taken along line XI—XI in FIG. 8.
Figure 12:
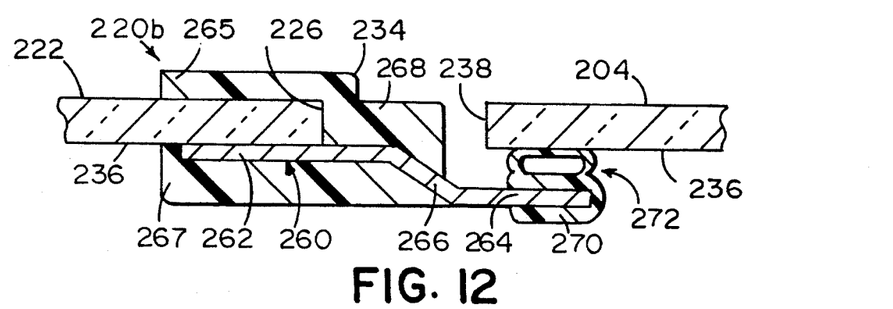

FIGS. 11 and 12 are section views illustrating various embodiments 220a and 220b of seal 220 between the rear-quarter lift window 202 and door lift window 204 taken along line XI—XI shown in FIG. 8. In a first embodiment shown in FIG. 11, the rear-quarter panel 222 includes a first or leading edge 226 in end-to-end alignment with trailing edge 238 of door panel 204. Leading edge 226 is partially enclosed by a plastic or roll-formed metal bracket 240 defining a channel 242 having inner walls 244 and 246 and a bottom wall 248. Depending upon the type of material, plastic or metal, bracket 240 is bonded to leading edge 226 of panel 222 by an adhesive such as an epoxy based upon diglycidyl ether of bisthenol-A cured by a common hardener such as amine. A diglycidyl ether may be found under the designation DER 331, produced by Dow Chemical Company of Midland, Mich. Inner walls 244, 246 extend inwardly a predetermined distance along the outer surfaces of panel 222 so that the bottom wall 248 of channel 242 engages leading edge 226. The portion of bracket 240 defining inner wall 246 of channel 242 is rolled back or bent upon itself to form flange 250 extending away from leading edge 226 so as to lie a predetermined distance from inner surface 236 of panel 204. Flange 250 may have one or more folds 252 in order to place the flange proximate inner surface 236 of panel 204.

Channel 242 of bracket 240, and a substantial portion of flange 250, are enclosed or encapsulated by molded gasket 234. The gasket has securing flanges 252 and 254 which extend in from leading edge 226 up over sidewalls 244, 246 of the channel and onto a portion of panel 222. Molded gasket 234 securely attaches bracket and flange 240 and 250, respectively, to leading edge 226. Gasket 234 may be molded on previously primed portions of glass sheet 222 from a polymeric material such as PVC or RIM urethane. End 254 of flange 250 is adapted to be received by jaw or channel 256 of bulb seal 258 formed from soft, pliable and resilient rubber or polymeric material similar to bubble seal 30 above, to secure the seal on the flange. A suitable bulb seal may be obtained from Standard Products of Dearborn, Mich., mentioned above. Bulb seal 258 is adapted to engage inner surface 236 of door panel 204. With panel 204 in the up and closed position bulb seal 258 is compressed between end 254 of flange 250, and inner surface 236 of door panel 204, forming a substantially tight weather seal therebetween.

FIG. 12 is a section view illustrating yet another embodiment 220b of bulb seal carrier described in relation to FIG. 11. As in the previous embodiment, rear-quarter panel 222 has a leading edge 226 which is in end-to-end alignment with trailing edge portion 238 of panel 204. Fixed to inner surface 236 of rear-quarter window 222 proximate leading edge 226, and extending along substantially the entire length of leading edge 226, is a seal carrying flange 260. Flange 260 is a metallic or plastic strip having a length substantially coextensive with the length of leading edge 226. The width of the flange is such that a first portion 262 is securely fastened to inner surface 236 of panel 222 and paralleling leading edge 226. The flange may be secured to glass panel 222 by the adhesive described above. The second portion of flange 264 may extend away from leading edge 226 so as to be located substantially parallel to inner surface 236 of panel 204 and spaced a predetermined distance therefrom. Flange 260 may contain one or more folds 266 paralleling a longitudinal centerline of the flange so as to properly distance the flange from inner surface 236 of panel 204.

The entire first portion 262 of the flange, and a substantial portion of the second portion 264, are entirely encapsulated by a molded trim piece 234 of PVC or RIM urethane on the previously primed glass panel edge as in previous embodiments. Molded trim piece 234 also encapsulates the periphery of leading edge 226 and secured thereto by securing flanges 265 and 267. Each securing flange extends from leading edge 226 inwardly on each side of the panel. Securing flanges 265, 267 are joined by a body portion 268 which forms a substantially abrupt boundary proximate trailing edge portion 238 of panel 204. Extending from body 268, inboard of inner surface 236 of panel 204, is the second portion 264 of flange 260. The edge of flange 264 is received in a channel 270 of a bulb seal 272 similar to seal 258 above adapted to seal with inner surface 236 of panel 204. As in the previous embodiment, when panel 204 is in the closed position, bulb seal 272 is compressed between inner surface 236 of panel 204 and flange 260 extending from trim piece 234, thus forming a substantially weathertight seal.

Although the above invention has been described with particular reference to window assemblies for vehicles, it is contemplated to be within the scope of this invention that the molded-in seal carrier may be employed within assemblies of camper trailers, aircraft, water craft, and the like. While several forms of the invention have been described, still other forms will now be apparent to those skilled in the art. The embodiments of the invention shown in the drawings and described herein are merely for illustrative purposes, and are not intended to limit the scope of the invention which is defined by the claims which follow.

The embodiments of the invention in which an exclusive property or privilege is claimed are defined as follows:

1. A panel assembly for sealing with a second panel of a vehicle, comprising:
    a first panel having a peripheral edge;
    a resilient gasket molded around and encapsulating at least a first portion of said peripheral edge of said first panel and having a portion adjacent to a peripheral edge of the second panel when installed in a vehicle; and
    a rigid seal carrier having a first edge overlapping, spaced from and generally parallel to said first portion of said first panel and embedded within said portion of said gasket adjacent the second panel, and a second edge of said seal carrier extending near a peripheral edge of the second panel in a plane generally parallel to said first portion of said first panel and adapted to receive a seal thereon.

2. The panel assembly of claim 1, further including seal means mounted along the second edge of said seal carrier for engaging the second panel and forming a substantially weathertight seal therewith.

3. The panel assembly of claim 2, wherein said first edge of said rigid flange includes a plurality of perforations for anchoring said first edge of said flange within said gasket.

4. A panel assembly for sealing with a second panel of a vehicle, comprising:
    a first panel having a peripheral edge;
    a gasket molded around and encapsulating at least a portion of said peripheral edge of said first panel and having a portion thereof adapted to be adjacent to and extend along the second panel when installed in a vehicle; and
    a seal carrier having a predetermined length with a first and a second edge, said first edge embedded and retained within said portion of said gasket adapted to be adjacent to and extend along the second panel, and said second edge of said seal carrier extending toward the second panel when installed, and being adapted to receive a seal thereon;
    seal means mounted along said second edge of said seal carrier for engaging the second panel and forming a substantially weathertight seal therewith;
    said seal carried also including a bezel encasing an exterior portion of said gasket and conforming thereto, said first edge of said seal carrier including a first end of said bezel embedded within said gasket proximate said first panel, said second edge of said seal carrier including a flange portion extending from said gasket at a position spaced from said first panel, said bezel further including a second end embedded within said gasket proximate said flange portion.

5. The panel assembly of claim 2, wherein said seal means includes a bubble seal having a jaw for receiving said seal carrier and fixing said bubble seal thereon, said bubble seal adapted to be compressed between the second panel and said seal carrier to form said seal when installed on a vehicle.

6. The panel assembly of claim 2, wherein said seal means includes a bulb seal having a jaw for receiving said second edge of said seal carrier, said bulb seal adapted to engage the second panel and be compressed between the second panel and said seal carrier when installed on a vehicle.

7. A panel assembly for sealing with a second panel of a vehicle, comprising:
    a first panel having a peripheral edge;
    a gasket molded around and encapsulating at least a portion of said peripheral edge of said first panel and having a portion thereof adapted to be adjacent to and extend along the second panel when installed in a vehicle;
    a seal carrier having a predetermined length with a first and a second edge, said first edge embedded and retained within said portion of said gasket adapted to be adjacent to and extend along said second panel, and said second edge of said seal carrier extending toward the second panel when installed, and being adapted to receive a seal thereon;
    seal means mounted along the second edge of said seal carrier for engaging the second panel and forming a substantially weathertight seal therewith; and
    an attachment member molded about and encapsulating another portion of said peripheral edge of said first panel, said attachment member adapted to interconnect said first panel to a window regulator mechanism for moving said first panel between first and second positions when installed in a vehicle.

8. The panel assembly of claim 1, wherein said first panel is transparent and said panel assembly is a window assembly.

9. The panel assembly of claim 1, wherein said first panel is opaque.

10. The panel assembly of claim 2, wherein said second edge of said seal carrier includes a flange extending outwardly of said gasket, the seal means to be mounted on said flange.

11. The panel assembly of claim 10, wherein said flange is formed from a polymeric material.

12. The panel assembly of claim 2, wherein said gasket is molded from a polymeric material selected from the group including polyvinyl chloride and reaction injection molded urethane.

13. A window assembly formed as a unit and adapted to be installed from the exterior in an opening of a vehicle adjacent a panel having a peripheral edge on the vehicle, comprising:
    a sheet-like window having a peripheral edge;
    a resilient gasket molded about and encasing at least a first portion of said peripheral edge of said window and having a portion adjacent to and extending along a portion of the peripheral edge of the panel;
    a rigid seal carrier having a first edge overlapping, spaced from and generally parallel to said first portion of said peripheral edge of said window and embedded within said gasket and a second edge of said seal carrier extending near the peripheral edge of the panel in a plane generally parallel to said first portion of said peripheral edge of said window; and
    seal means received along said second edge of said seal carrier for forming a substantially weathertight seal with the panel.

14. A window assembly formed as a unit and adapted to be installed from the exterior in an opening of a vehicle adjacent a panel having a peripheral edge on the vehicle, comprising:
- a sheet-like window having a peripheral edge;
- a gasket molded about and encasing at least a portion of said peripheral edge of said window and having a portion adjacent to and extending along a portion of the peripheral edge of the panel;
- a seal carrier having first and second edges and a length coextensive with said portion of said gasket adjacent to and extending along said portion of the peripheral edge of the panel, said first edge of said seal carrier embedded within said portion of said gasket adjacent to and extending along said portion of the panel, said second edge extending near the peripheral edge of the panel;
- seal means received along the second edge of said seal carrier for forming a substantially weathertight seal with the panel; and
- an attachment member molded about and encapsulating at least another portion of said peripheral edge of said window, and adapted to interconnect said window to a window regulator mechanism for moving said window between a first and a second position.

15. The window assembly of claim 13, wherein said seal carrier further includes said molded gasket entirely encapsulating said first edge of said seal carrier.

16. A window assembly formed as a unit and adapted to be installed from the exterior in an opening of a vehicle adjacent a panel having a peripheral edge on the vehicle, comprising:
- a sheet-like window having a peripheral edge;
- a gasket molded about and encasing at least a portion of said peripheral edge of said window and having a portion adjacent to and extending along a portion of the peripheral edge of the panel;
- a seal carrier having first and second edges and a length coextensive with said portion of said gasket adjacent to and extending along said portion of the peripheral edge of the panel, said first edge of said seal carrier embedded within said portion of said gasket adjacent to and extending along said portion of the panel, said second edge extending near the peripheral edge of said panel; and
- seal means received along said second edge of said seal carrier for forming a substantially weathertight seal with the panel;
- said seal carrier including a bezel, said first edge of said seal carrier including a first edge on said bezel captured within said gasket proximate said peripheral edge of said window, said bezel enclosing and conforming to an outer surface of said gasket, said second edge of said seal carrier including a flange portion formed on said bezel and extending from said portion of said gasket adjacent to and extending along said portion of the panel to a point near the peripheral edge of the panel, said bezel also including a second edge captured within said gasket proximate said flange portion.

17. The window assembly of claim 13, wherein said seal means includes:
- a bubble seal received along said second edge; and
- means integral with said bubble seal for detachably retaining said bubble seal on said second edge of said seal carrier.

18. The window assembly of claim 13, wherein said seal means includes:
- a bulb seal received along said second edge; and
- means integral with said bulb seal for detachably retaining said bulb seal on said second edge of said seal carrier.

19. A window assembly having a seal for a vehicle panel to prevent entry of water, dust, dirt, road noise and the like, said assembly, comprising:
- a first panel having a shape adapted to fit within an opening in a vehicle, said panel having a peripheral edge;
- a resilient gasket molded about and encapsulating at least a portion of said peripheral edge of said first panel and adapted to extend adjacent the vehicle panel, said gasket having a pair of securing flanges extending inwardly of said first panel from said peripheral edge and bonded thereto;
- rigid carrier means having a first portion captured within said gasket and overlapping and spaced from said portion of said first panel peripheral edge, and a second portion extending away from said gasket toward the vehicle panel in a plane generally parallel to said portion of said first panel peripheral edge when installed in a vehicle and adapted to be spaced a predetermined distance from the vehicle panel; and
- an elongate seal disposed along substantially the entire second portion of said carrier means and providing a substantially weathertight seal with the vehicle panel.

20. The window assembly of claim 19, wherein said carrier means includes:
- a seal carrier having said first portion encapsulated entirely within said gasket, and said second portion extending from said peripheral edge of said first panel toward the vehicle panel and adjacent thereto.

21. The window assembly of claim 20, wherein said seal carrier includes said second portion extending from said gasket encapsulating said first portion.

22. The window assembly of claim 20, wherein said elongate seal includes a bulb seal disposed along said second portion and adapted to be compressed between the vehicle panel and said carrier means when installed.

23. The window assembly of claim 20, wherein said elongate seal includes a bubble seal disposed along substantially the entire length of said second portion and adapted to be compressed between the vehicle panel and said carrier means when installed.

24. A window assembly having a seal for a vehicle panel to prevent entry of water, dust, road noise and the like, said assembly comprising:
- a first panel having a shape adapted to fit within an opening in a vehicle, said panel having a peripheral edge;
- a gasket molded about and encapsulating at least a portion of said peripheral edge of said first panel and adapted to extend adjacent the vehicle panel, said gasket having a pair of securing flanges extending inwardly of said first panel from said peripheral edge and bonded thereto;
- carrier means for receiving a weather seal having a first portion captured and encapsulated within said gasket, and a second portion extending away from said gasket toward the vehicle panel when installed in a vehicle, said second portion adapted to be spaced a predetermined distance from the vehicle panel when installed on a vehicle; and
- an elongate seal disposed along substantially the entire second portion of said carrier means and adapted to provide a substantially weathertight seal with the vehicle panel;

said carrier means further including a bezel having a first and second edge and a flange portion, said first edge captured within said gasket adjacent an outer one of said securing flanges, said bezel wrapping around and conforming to an outer surface of said gasket and substantially enclosing said portion of said gasket adjacent the vehicle panel when installed, said bezel forming said flange portion and extending from said portion of said gasket adjacent the vehicle panel to lie adjacent thereto when installed, and said second edge of said bezel also captured within said gasket, one of said bezel first and second edges being said carrier means first portion, said bezel flange portion being said carrier means second portion.

25. The window assembly of claim 24, wherein said elongate seal includes a bulb seal disposed along said second portion and adapted to be compressed between the vehicle panel and said carrier means when installed.

26. The window assembly of claim 24, wherein said elongate seal includes a bubble seal disposed along substantially the entire length of said second portion and adapted to be compressed between the vehicle panel and said carrier means when installed.

27. The window assembly of claim 24 wherein said flange portion of said bezel includes a section folded upon itself between said first and second bezel edges and projecting outwardly from said bezel portion which encases said gasket.

28. The window assembly of claim 27 wherein each of said first and second edges is hook-shaped for retention within said molded gasket.

29. The window assembly of claim 28 wherein said elongate seal includes a sealing portion adapted to engage the vehicle panel and a channel portion adapted to be pressed over a free end of said flange portion of said bezel.

* * * * *

UNITED STATES PATENT AND TRADEMARK OFFICE
CERTIFICATE OF CORRECTION

PATENT NO. : 5,261,721
DATED : November 16, 1993
INVENTOR(S) : Conger et al.

It is certified that error appears in the above-indentified patent and that said Letters Patent is hereby corrected as shown below:

Column 4, line 9;

After "gasket" insert --.--.

Column 5, line 3;

"b=" should be --be--.

Column 7, line 26;

"nave" should be --have--.

Column 9, Claim 4, line 53;

"carried" should be --carrier--.

Signed and Sealed this

Second Day of August, 1994

Attest:

BRUCE LEHMAN

*Attesting Officer*      *Commissioner of Patents and Trademarks*